UNITED STATES PATENT OFFICE.

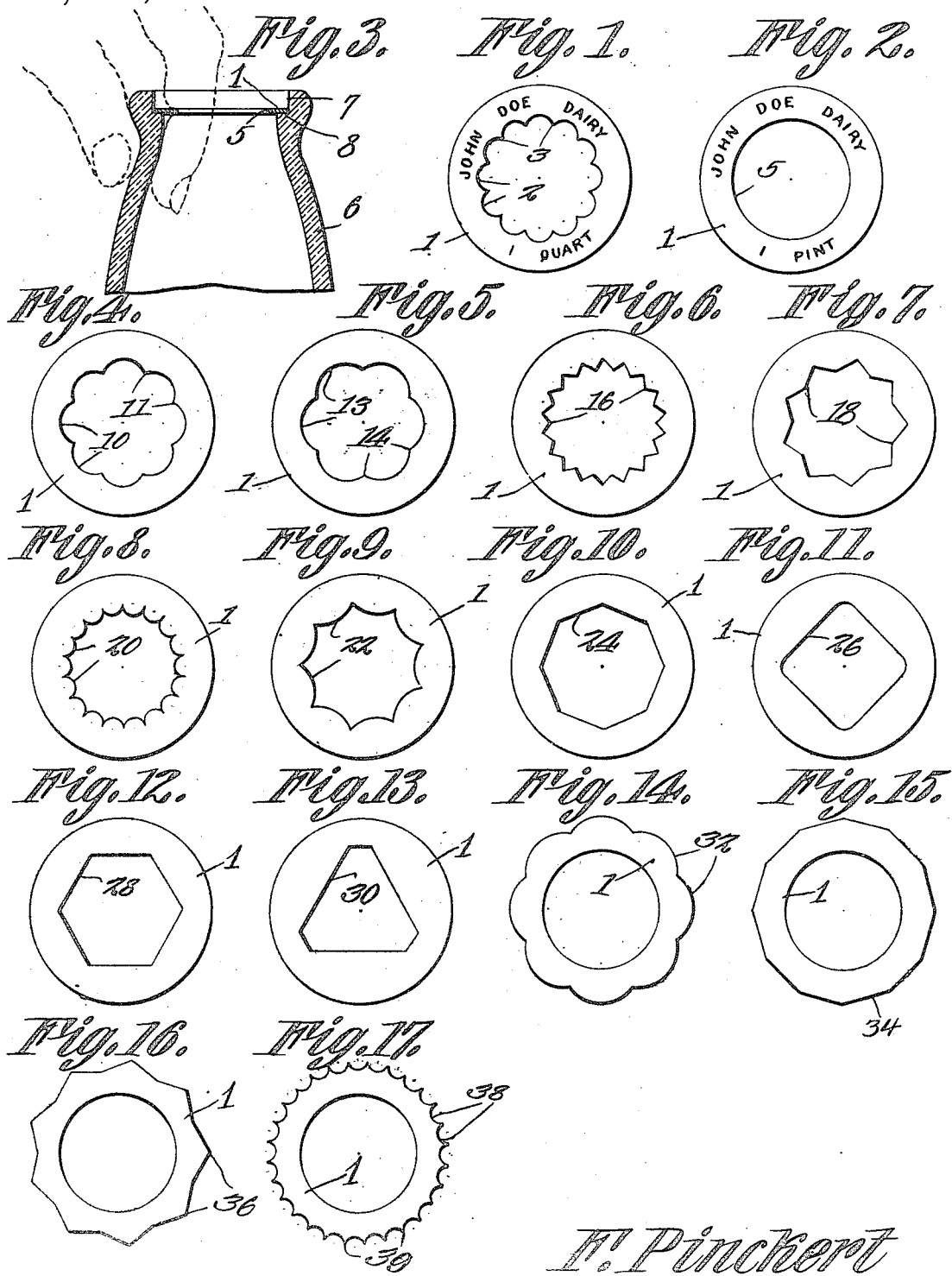

FRANK PINCKERT, OF CARTHAGE, MISSOURI.

MILK-CHECK.

1,209,993.   Specification of Letters Patent.   Patented Dec. 26, 1916.

Application filed February 23, 1916.   Serial No. 80,014.

*To all whom it may concern:*

Be it known that I, FRANK PINCKERT, a citizen of the United States, residing at Carthage, in the county of Jasper and State of Missouri, have invented a new and useful Milk-Check, of which the following is a specification.

The present invention aims to provide a novel milk check, and aims to provide a check of that nature which can be applied to a milk or cream bottle in a novel manner, said check having means for indicating, either by the sight or touch, the quantity of milk desired, and the checks may be provided with different means for indicating different quantities of milk desired.

The present check is of annular form, or is in the form of a flat ring, in order that it can seat within the mouth of a milk bottle with its inner edge projecting beyond the shoulder upon which the check is seated, so that when the milk man in collecting the bottles, places his forefinger or other finger, into the neck of the bottle to lift the bottle, said finger will be inserted through the check, enabling the check to be readily removed, and furthermore the finger can contact with the ring thereby indicating, by the sense of touch, to the milk man, the amount of milk desired by the customer. This enables the milk man to know the amount of milk desired even though it is dark, so that the check cannot be seen clearly, and when the finger is inserted into the neck of the bottle to carry the bottle, the check is simultaneously prevented from being lost, since the finger will be inserted therethrough, and furthermore, the finger can be brought against the check to feel the same, and to also remove the check easily. The checks can be made inexpensively, being readily stamped from suitable sheet metal, and can be provided with various means, preferably upon their inner or outer edges, for indicating the quantity of milk or other commodity for which the check is good. The checks can be sold to the customers by the milk dealer, and can be readily placed in the mouth of the bottle when the bottle is set out to be collected, and there is no liability for the check to drop into the bottle. With ordinary checks or tickets, they usually drop into the bottle, and if there is any water or milk left therein, the tickets will become soaked, and should it be freezing weather, the ticket will be frozen to the interior of the bottle, thus rendering it difficult to remove the same. There are a number of disadvantages attendant to the use of ordinary milk checks and tickets, which need not be discussed in great detail, since they are well known and recognized.

With the foregoing and other objects in view which will be apparent as the nature of the invention is better understood, the invention resides in the provision of a specially constructed milk check applicable to a milk bottle for the intended purposes, it being understood that changes within the scope of what is hereinafter claimed can be resorted to, without departing from the spirit of the invention.

The invention is illustrated in the accompanying drawing, wherein:—

Figure 1 is a plan view of one of the checks. Fig. 2 is a similar view of another check. Fig. 3 is a vertical section illustrating one of the checks applied to the neck of a milk bottle. Figs. 4 to 17, inclusive, are plan views of different forms of milk checks which can be used.

The check illustrated in Fig. 1 comprises an annulus or flat ring 1 provided with any suitable inscription or legends upon its face, and is preferably stamped from sheet aluminum, although various materials may be used. The inner edge of the ring 1 is scalloped, having the curved notches 2 providing the sharp spurs 3 projecting inwardly. The check illustrated in Fig. 2 comprises a flat ring 1, the inner edge of which is plain, as at 5, the same as the outer edge. The opening of each ring is sufficiently large for the introduction of the forefinger or other finger of a hand, and the ring is sufficiently large in diameter to seat within the mouth of an ordinary milk bottle, and to prevent the ring from falling down into the bottle. Thus, as illustrated in Fig. 3, the ring or check 1 can be dropped into the rabbet 7 at the mouth of the bottle 6, to seat on the shoulder or ledge 8, and the ring or check is wider than the shoulder 8 so that the inner edge of the ring projects from said shoulder and overhangs the interior of the bottle. There is no possibility of the check or ring dropping into the bottle since it is too large in diameter to do so, and the check will therefore remain in place in the mouth of the bottle where it can be readily removed. Now, when the bottle is picked up by the milk deliverer, the forefinger or other finger being inserted into the neck of the bottle, as illustrated in dotted lines in Fig. 3, for picking up the bottle, will at the same time be inserted through the check, and the finger can be brought against the inner edge of the check, to determine, in the night time, the amount indicated thereby, whereby the proper amount of milk or cream can be left. The finger is also in place, in order that the check can be readily removed, by lifting one side thereof out of the bottle by the finger, the check remaining on the finger. If the finger rests against the plain edge 5 of the check or ring 1, the milk man will know that one pint of milk is desired, and with the check illustrated in Fig. 2, and if the finger rests against the spurs 3, it will be known that one quart of milk is desired with the check illustrated in Fig. 1. Various forms of checks, however, can be used.

A number of different checks are illustrated in Figs. 4 to 17, inclusive. The ring 1 illustrated in Fig. 4 has curved notches 10 wider than the notches 2 and providing pointed spurs 11 spaced farther apart than the spurs 3 for indicating a different amount of milk. The curved notches 13 of the ring 1 illustrated in Fig. 5 are still wider than the notches 10 and provide sharp spurs 14 spaced still farther apart to indicate another amount of milk. As illustrated in Fig. 6, the ring 1 has V-shaped spurs 16 around its inner edge and the ring 17 illustrated in Fig. 7 has V-shaped spurs or teeth 18 spaced farther apart than the spurs 16 to indicate a different amount. The rings 1 illustrated in Figs. 8 and 9 are provided at their inner edges with rounded lugs 20 and 22, respectively, of different dimensions to indicate different amounts. The rings 1 illustrated in Figs. 10, 11, 12 and 13 have the octagonal, square, hexagonal and triangular openings 24, 26, 28 and 30, respectively, for indicating different amounts. The rings above described all have their outer edges plain, while the rings 1 illustrated in Figs. 14, 15, 16 and 17, respectively, have their inner edges plain. The ring 1 shown in Fig. 14 has rounded lugs 32 upon its periphery or outer edge, formed by scalloping said edge. The ring 1 shown in Fig. 15 has a polygonal outer edge 34, the ring shown in Fig. 16 has V-shaped spurs 36 around its outer edge, while the ring illustrated in Fig. 17 is provided in its outer edge with curved notches 38 providing sharp spurs 39. These and other forms of checks can be used with the same result.

The checks can be readily strung upon a wire, string or other element, so that they can be dipped in boiling water or a sterilizing solution, for purpose of sanitation.

Having thus described the invention, what is claimed as new is:

1. A milk check embodying a flat ring adapted to seat within the mouth of a milk bottle, the ring being sufficiently wide to overhang the interior of the bottle and its aperture being adapted to receive the finger of a hand whereby the ring can be readily removed from the bottle, one edge of the ring being so formed, as to indicate by the sense of touch, the amount for which it is good.

2. A milk check embodying a flat ring adapted to seat within the mouth of a milk bottle, the ring being of sufficient width that its inner edge portion overhangs the interior of the bottle and the aperture of the ring being adapted to receive the finger of a hand, whereby the ring can be readily removed from the bottle, the inner edge of the ring being so formed, as to indicate by the sense of touch, the amount for which the check is good.

In testimony that I claim the foregoing as my own, I have hereto affixed my signature in the presence of two witnesses.

FRANK PINCKERT.

Witnesses:
 FRANK R. BIRKHEAD,
 R. A. MOONEYHAM.